US011982424B1

(12) United States Patent
Lassen et al.

(10) Patent No.: US 11,982,424 B1
(45) Date of Patent: May 14, 2024

(54) EXTERNAL LOUVERS FOR LINEAR LUMINAIRE

(71) Applicant: Elemental LED, Inc., Reno, NV (US)

(72) Inventors: Andrew Lassen, Reno, NV (US); James Edward Stillman, Guangdong (CN); Nathan Davey, Reno, NV (US)

(73) Assignee: Elemental LED, Inc., Reno, NV (US)

( * ) Notice: Subject to any disclaimer, the term of this patent is extended or adjusted under 35 U.S.C. 154(b) by 0 days.

(21) Appl. No.: 18/452,510

(22) Filed: Aug. 18, 2023

(51) Int. Cl.
*F21V 11/08* (2006.01)
*F21V 11/02* (2006.01)
*F21V 11/06* (2006.01)
*F21Y 103/10* (2016.01)

(52) U.S. Cl.
CPC ............... *F21V 11/08* (2013.01); *F21V 11/02* (2013.01); *F21V 11/06* (2013.01); *F21Y 2103/10* (2016.08)

(58) Field of Classification Search
CPC .......... F21V 11/08; F21V 11/12; F21V 11/14; F21V 11/02; F21V 11/06; F21Y 2103/10
USPC .......................................................... 362/342
See application file for complete search history.

(56) References Cited

U.S. PATENT DOCUMENTS

D117,643 S 11/1939 Stewart
D131,845 S 3/1942 Louis
D138,990 S 10/1944 Biller
2,398,624 A * 4/1946 Decker .................. F21V 13/02 362/342
D153,001 S 3/1949 Meyer
D153,002 S 3/1949 Meyer
D166,034 S 2/1952 Gray
D240,853 S 8/1976 Aronson
4,494,175 A * 1/1985 Gawad ...................... F21S 8/02 362/225

(Continued)

FOREIGN PATENT DOCUMENTS

BE 876744 A 10/1979
CN 111649263 A 9/2020

(Continued)

OTHER PUBLICATIONS

Arraystorm (RR Kabel Ltd.), "Linear 5275 Louver." Internet. Available at https://arraystorm.com/product/channels/linear-louver/. Version of Mar. 30, 2023.

(Continued)

*Primary Examiner* — Laura K Tso
(74) *Attorney, Agent, or Firm* — United IP Counselors, LLC

(57) ABSTRACT

A set of louvers adapted for use with a linear luminaire has a first wall, a second wall spaced from the first wall, and a plurality of louvers extending between the first wall and the second wall. Each of the plurality of louvers is fixed to the first wall and the second wall, and may be integrally formed with the walls, and each of the plurality of louvers is spaced from the others. First and second side portions depend from the first wall and the second wall. An internal cavity of the set of louvers is defined by bottoms of the plurality of louvers and the first and second side portions. Engaging structure is defined on inwardly-facing surfaces of the first and second side portions. Combinations including the set of louvers and a linear luminaire in which the set of louvers "snaps on" externally to the linear luminaire are disclosed.

21 Claims, 8 Drawing Sheets

(56) References Cited

U.S. PATENT DOCUMENTS

| | | | | |
|---|---|---|---|---|
| D292,026 | S | 9/1987 | Krol | |
| D330,946 | S | 11/1992 | Dieperink | |
| D334,076 | S | 3/1993 | Dieperink | |
| D351,039 | S | 9/1994 | Cole, Jr. | |
| D360,271 | S | 7/1995 | Butler | |
| D377,231 | S | 1/1997 | Degelmann | |
| D384,769 | S | 10/1997 | Holten | |
| 5,908,234 | A * | 6/1999 | Kreeft | F21V 11/02 362/342 |
| 6,139,169 | A * | 10/2000 | Caferro | F21V 7/22 362/342 |
| D441,891 | S | 5/2001 | Herst et al. | |
| D485,932 | S | 1/2004 | Crane | |
| D499,834 | S | 12/2004 | Yu et al. | |
| D586,948 | S | 2/2009 | Mayfield, III et al. | |
| D600,851 | S | 9/2009 | Nourishad et al. | |
| 8,057,064 | B2 * | 11/2011 | Yeh | F21V 13/10 362/342 |
| 8,118,453 | B2 * | 2/2012 | Holten | F21V 11/02 362/291 |
| D678,594 | S | 3/2013 | McCane | |
| 10,788,170 | B1 | 9/2020 | Bryan | |
| 11,118,758 | B1 | 9/2021 | Greenspan et al. | |
| D974,627 | S | 1/2023 | Landry | |
| 2005/0243557 | A1 * | 11/2005 | Holten | F21V 11/02 362/291 |
| 2016/0033088 | A1 | 2/2016 | Mayfield, III et al. | |
| 2018/0038562 | A1 | 2/2018 | Kim et al. | |
| 2022/0228723 | A1 | 7/2022 | Bryan | |

FOREIGN PATENT DOCUMENTS

| | | | |
|---|---|---|---|
| CN | 110274168 | B | 6/2021 |
| WO | 2004055431 | A1 | 7/2004 |
| WO | 2021136177 | A1 | 7/2021 |

OTHER PUBLICATIONS

Bartco Lighting "Daryl BDA30." Internet. Available at https://www.bartcolighting.com/bda30/. Version of Jun. 10, 2023.

Lumenwerx, "Parabolic Louvers for Square: New Optics, New Look." Internet. Available at https://lumenwerx.com/en/news/parabolic-louvers-squero-new-optics-new-look/. No date, but believed to be prior art.

* cited by examiner

EXTERNAL LOUVERS FOR LINEAR LUMINAIRE

TECHNICAL FIELD

The invention relates to linear lighting, and more particularly, to external louvers for linear luminaires.

BACKGROUND

Different types of light sources emit light differently. A light source may emit a narrow, highly-focused beam, or a broad, diffuse beam. A single light source may emit light in multiple directions, with a beam of a different shape and intensity in each direction. In fields like lighting design and architecture, considerable effort is expended to understand how a light source emits light, and to match the light-emission characteristics of a light source with the design requirements. Techniques such as goniophotometry are used to characterize the angular distribution of light from a light source.

Only infrequently does a light source perfectly fit a need. A beam may be too wide, for example, or light may spill out in unwanted directions. When it is necessary or desirable to control the angular distribution of emitted light, there are two main techniques: physical control and optical control. Physical control of light emission relies on physical devices, like louvers and shutters, to constrain the emission of light or to block it entirely in certain directions. Optical control of light emission uses lenses, prisms, mirrors, and other refractive and reflective devices to direct light.

Solid-state lighting, using devices like light-emitting diodes (LEDs), has supplanted legacy incandescent light sources. Among other advantages, LEDs generally have greater efficacy than legacy light sources, operate at lower temperatures, and may have longer lifetimes, at least in some applications. Perhaps the greatest advantage of LEDs, though, is the fact that LED-based luminaires have been made in numerous forms to fit myriad applications. There are now LED-based replacements for incandescent lamps, fluorescent tubes, troffers, and even neon luminaires.

One of the more popular forms of LED-based luminaire is the linear luminaire. A linear luminaire is a long, typically narrow luminaire comprised of one or more strips of linear lighting. Each strip of linear lighting is a printed circuit board on which LED light engines are disposed, typically spaced apart at some regular pitch or spacing. While linear luminaires may have the advantages of solid-state lighting, they also have some of the same problems as legacy lighting sources—including those of beam width and shape.

Optical and physical solutions have been proposed for controlling the beam width and shape of a linear luminaire. For example, U.S. Pat. No. 10,788,170 discloses a two-element optical system for a linear luminaire that can narrow the beam width to, e.g., 10°, full width, half maximum. U.S. Patent Application Publication No. 2022/0228723 discloses an optical system that can direct the beam from a linear luminaire.

U.S. Pat. No. 11,118,758 discloses a louvered physical system for constraining the beam width of a linear luminaire. The louvers of this patent lie within the linear luminaire, which may limit the versatility of the linear luminaire.

BRIEF SUMMARY

One aspect of the invention relates to a set of louvers. The set of louvers has a first wall, a second wall spaced from the first wall, and a plurality of louvers extending between the first wall and the second wall. Each of the plurality of louvers is fixed to the first wall and the second wall, and may be integrally formed with the walls, and each of the plurality of louvers is spaced from the others. First and second side portions depend from the first wall and the second wall. An internal cavity of the set of louvers is defined by bottoms of the plurality of louvers and the first and second side portions. Engaging structure is defined on inwardly-facing surfaces of the first and second side portions.

The individual slats or louvers in the set of louvers are typically spaced apart from each other at a regular spacing or pitch. The upper face of the set of louvers may have various shapes. For example, the first wall and the second wall may have generally equal heights and each of the plurality of louvers may match the heights of the first wall and the second wall. In some cases, the first wall may have a height greater than a height of the second wall. In that case, each of the plurality of louvers may match the height of the first wall at the first wall and the height of the second wall at the second wall. The transition between heights may be linear, giving the set of louvers a triangular appearance to its top in end elevational view. The engaging structure of the set of louvers may comprise a set of tongues.

Another aspect of the invention relates to a combination of the set of louvers described above and a linear luminaire. The linear luminaire includes a channel, a strip of linear lighting positioned in the channel, and a covering closing the channel. The engaging structure of the set of louvers is adapted to engage the linear luminaire. For example, the engaging structure may comprise a set of tongues that engages with grooves provided in the linear luminaire. In some cases, the grooves may be defined between the channel and the covering of the linear luminaire.

Yet another aspect of the invention also relates to a set of louvers. The set of louvers has a first wall, a second wall spaced from the first wall, and a plurality of louvers extending between the first wall and the second wall. Each of the plurality of louvers is fixed to the first wall and the second wall, and may be integrally formed with the walls, and each of the plurality of louvers is spaced from the others. First and second side portions depend from the first wall and the second wall. An internal cavity of the set of louvers is defined by bottoms of the plurality of louvers and the first and second side portions.

Other aspects, features, and advantages of the invention will be set forth in the description that follows.

BRIEF DESCRIPTION OF THE DRAWING FIGURES

The invention will be described with respect to the following drawing figures, in which like numerals represent like features throughout the description, and in which.

DETAILED DESCRIPTION

Figure 1:
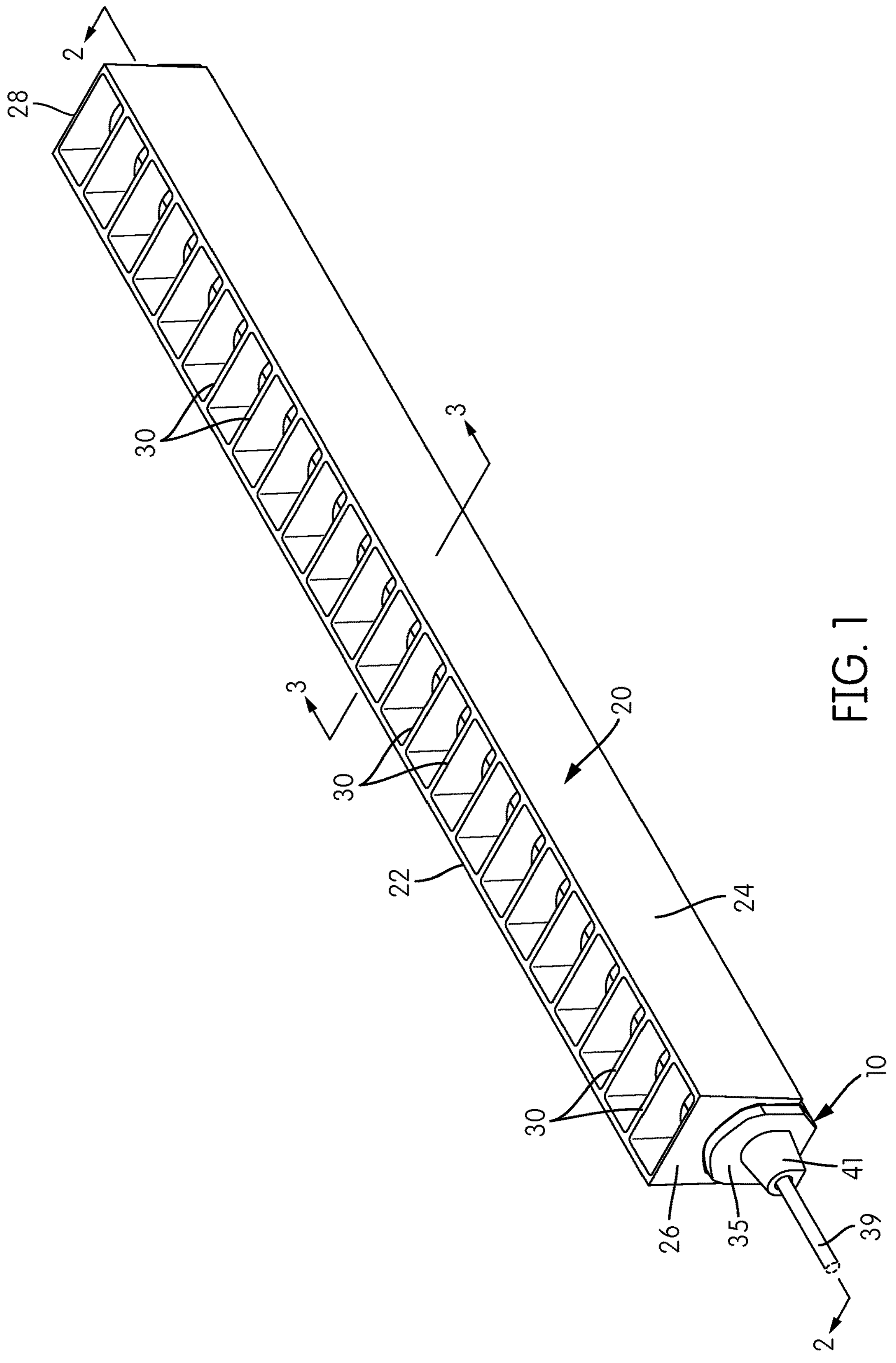
FIG. 1 is a perspective view of a linear luminaire with an external set of louvers installed.

FIG. 1 is a perspective view of a linear luminaire, generally indicated at 10, according to one embodiment of the invention. The linear luminaire 10 has an externally-installed set of louvers, generally indicated at 20. More specifically, the set of louvers 20 is installed overtop of the linear luminaire 10 and snap into place.

The set of louvers 20 has a rear wall 22, a front wall 24, and respective end walls 26, 28 that connect the rear wall 22 and the front 24 in a shape that is rectangular in top plan view. The rear wall 22 and front wall 24 are parallel to one another in the illustrated embodiment, and the end walls 26, 28 are parallel to one another and perpendicular to the other walls 22, 24, giving the set of louvers 20 a generally rectilinear shape. Within the set of louvers 20, individual slats or louvers 30 extend between the rear wall 22 and the front wall 24 at a regular pitch or spacing and are anchored to and integral with both walls 22, 24. The individual slats or louvers 30 are all mutually parallel to one another and to the end walls 26, 28 in the illustrated embodiment. The walls 20, 22, 24, 26 and the individual slats or louvers 30 terminate at the same upper vertical plane, meaning that the set of louvers 20 is flat across its top. While this description refers to the end walls 26, 28 as specific, distinguishable structures, in some cases, the end walls 26, 28 may simply comprise the first and last, respectively, of the individual slats or louvers 30 in the set of louvers 20.

Figure 2:
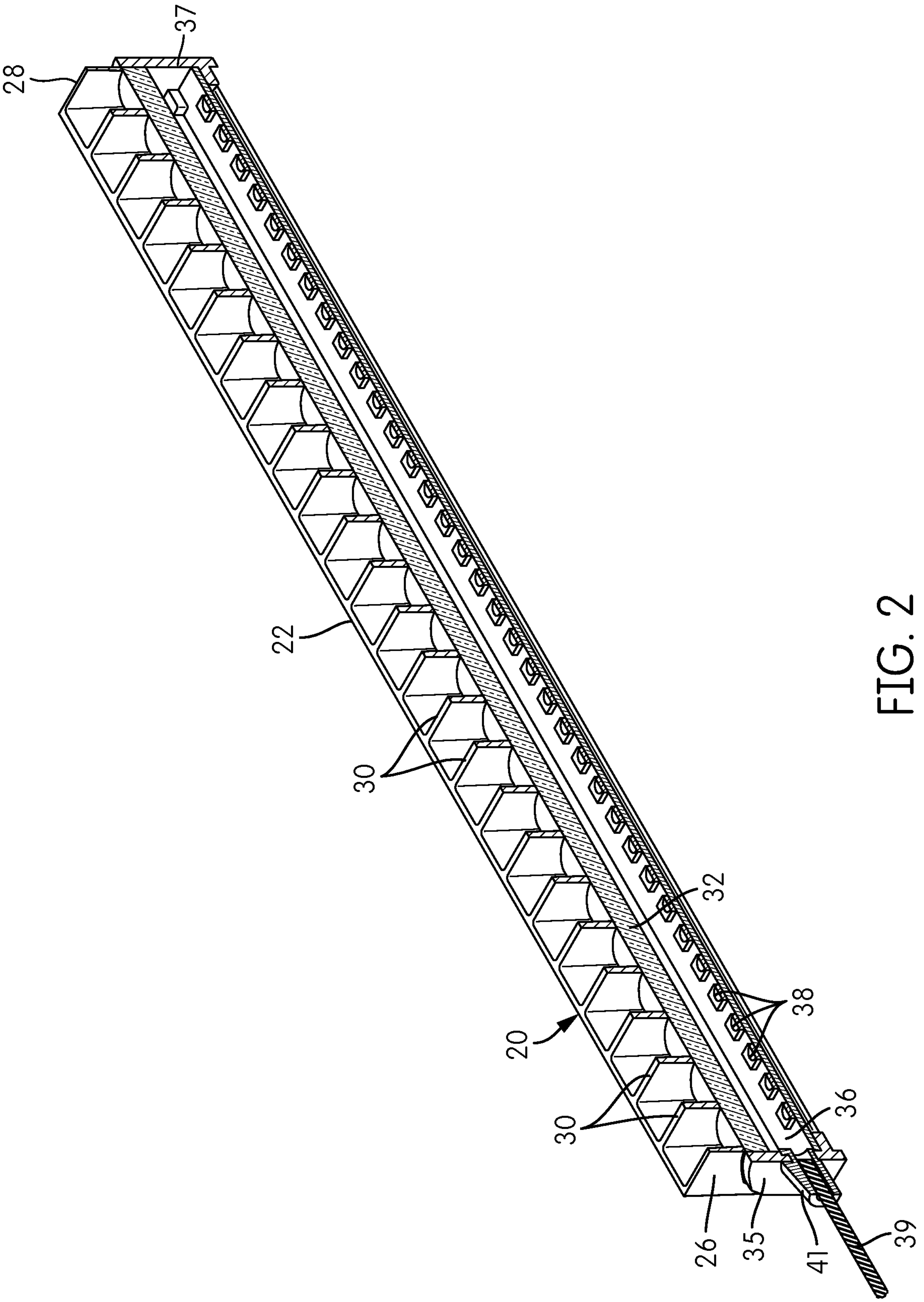
FIG. 2 is a cross-section of the linear luminaire of FIG. 1, taken through Line 2-2 of FIG. 1.
Figure 3:
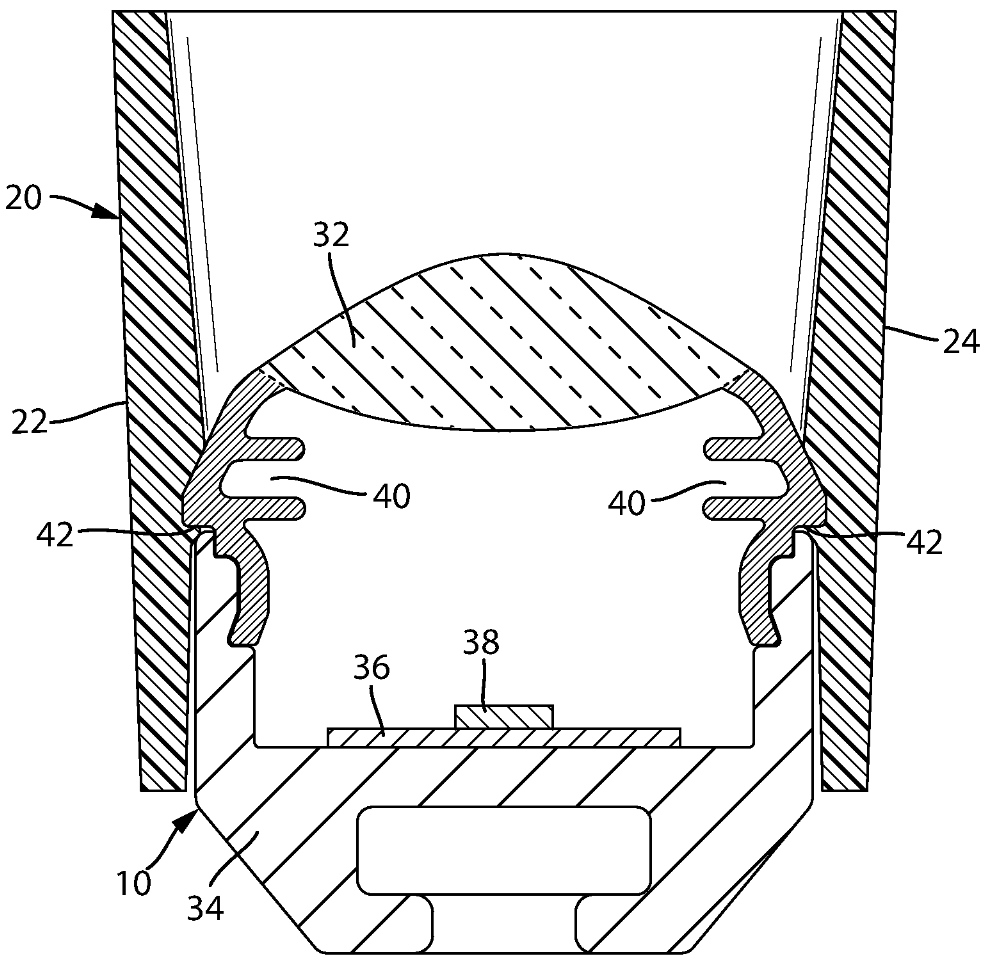
FIG. 3 is a cross-section of the linear luminaire of FIG. 1, taken through Line 3-3 of FIG. 1.

FIG. 2 is a cross-section of the linear luminaire 10 and set of louvers 20 taken through Line 2-2 of FIG. 1, i.e., along the length of the set of louvers 20. FIG. 3 is a cross-section of the linear luminaire 10 and set of louvers 20 taken through Line 3-3 of FIG. 1, i.e., across the width of the set of louvers 20. As shown in these figures, the bottom of the set of louvers 20 has an internal cavity contoured to match the contours of the linear luminaire 10 on which it is installed.

In this embodiment, the linear luminaire 10 is of the type described in U.S. Pat. No. 10,788,170, which is incorporated by reference in its entirety. As was noted briefly above, this patent discloses optical systems for linear luminaires. These optical systems may have one element or two elements. If two elements are used, the outermost element 32 (best seen in FIG. 3), which is a lens in the illustrated embodiment, engages the channel 34 in which the printed circuit board (PCB) 36 is installed. The PCB 36 carries the LED light engines 38, which are typically spaced apart at a regular spacing or pitch. That pitch may vary considerably depending on the application and other factors, ranging from a few millimeters to a few centimeters. The outermost element 32 of the system defines a pair of opposed internal slots 40 that allow it to carry an inner element, which may be a diffuser or another lens, to name a few options. For the sake of simplicity in illustration, no inner element is shown in these views, as only the outermost element 32 is relevant to the engagement of the set of louvers 20.

As can be seen in FIG. 3, the set of louvers 20 "snaps on" to the linear luminaire 10. That is, the set of louvers 20 has an internal cavity that is contoured around the outermost element 32, with small tongues 42 that, in this case, fit into respective side grooves 43 in the linear luminaire 10 that are defined between the top of the channel 34 and the outermost element 32 that is engaged with it.

The extent of the set of louvers 20 is such that it covers the entirety or at least substantially the entirety of the extent of the linear luminaire 10. The set of louvers 20 may be a cast or molded component. Since linear luminaires 10 are often extruded and can be made to arbitrarily long lengths, in some cases, an individual set of louvers 20 may not be as long as the linear luminaire 10 with which it is intended to work. If needed, several sets of louvers 20 may be used to cover a single linear luminaire 10. Those several sets of louvers 20 may or may not be the same, as in some cases, it may be desirable to have different light emission properties across the length of the linear luminaire 10. As can be seen in FIGS. 1 and 2, the channel 34 is capped with endcaps 35, 37, and the set of louvers 20 stops just short of the endcaps 35, 37 in this embodiment. The endcaps 35, 37 are different in that one endcap 35 allows a power cord 39 to penetrate. A strain relief 41 is present on the power cord 39. Wires from the power cord 39 typically connect to solder pads or other connectors on the PCB 36 (not shown in the figures).

The features of the endcaps 35, 37 and the manner in which they attach to the channel 34 are not critical to the set of louvers 20. The manner in which a channel 34 is closed and the manner in which power is brought into in the channel 34 may vary considerably. However, as those of skill in the art will note from FIGS. 1 and 2, the set of louvers 20 does not obstruct such functional features. In other words, in this embodiment, no special changes need be made to functional features of the linear luminaire 10 for the set of louvers 20 to function. This is one advantage of a set of louvers 20 according to an embodiment of the present invention.

Figure 4A:
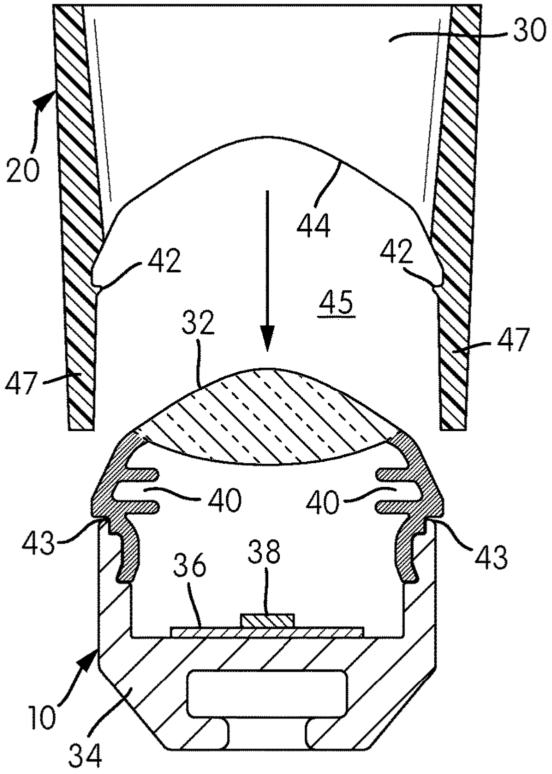
FIGS. 4A-4C are a series of cross-sectional views similar to the view of FIG. 3, illustrating the attachment of the external set of louvers.
Figure 4B:
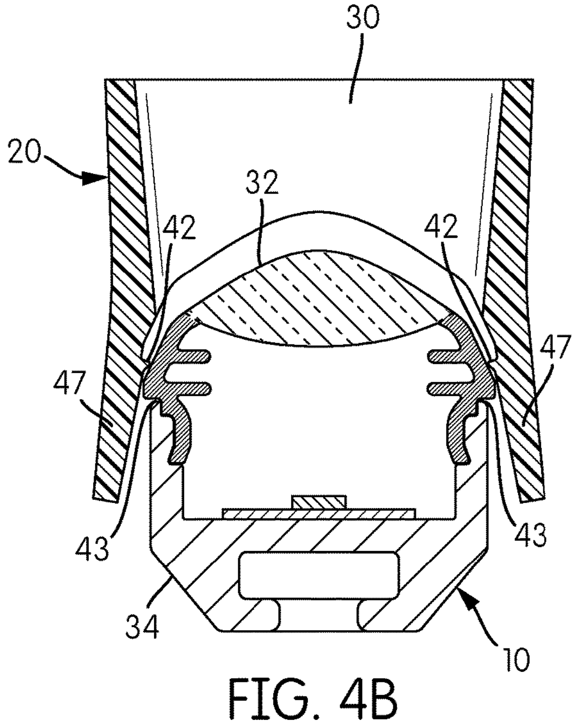
Figure 4C:
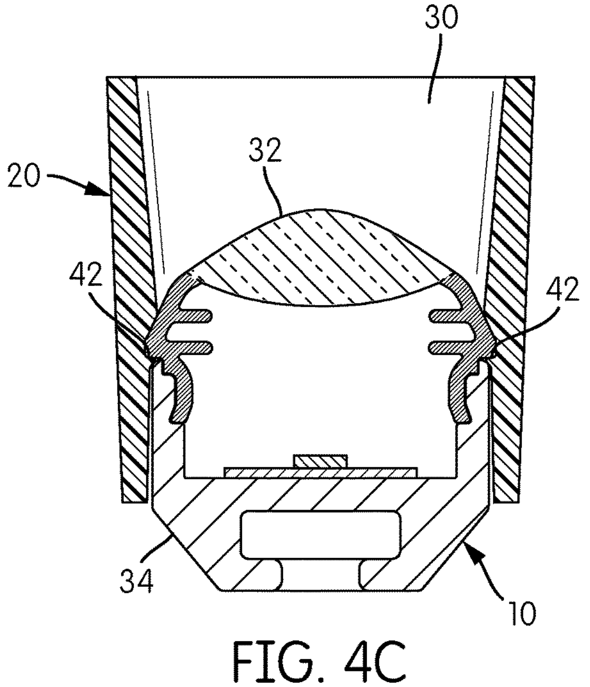

FIGS. 4A-4C are a series of cross-sectional views, similar to the view of FIG. 3, illustrating the process of attaching a set of louvers 20 to a linear luminaire 10. As was alluded to above, the internal contour 44 of the set of louvers 20 generally matches the contour of the outermost element 32. In other words, the set of louvers 20 defines an internal cavity 45 (best seen in FIG. 4A) that accommodates at least a portion of the linear luminaire 10, with the internal contour 44 defined along bottom edges of the slats or louvers 30. In this embodiment, each of the slats or louvers 30 has an identical contour 44 to its bottom edge, although that need not be the case in all embodiments.

The set of louvers 20 is brought directly down over the linear luminaire 10. When contact occurs between the tongues 42 and the outermost element 32, the lower portions 47 of the set of louvers 20 are forced to deflect outwardly as the tongues 42 slide down over the outermost element, as shown in FIG. 4B, before the tongues 42 snap into the grooves 43. The final, engaged position of the set of louvers 20 is shown in FIG. 4C, which is identical to the position shown in FIG. 3.

Figure 5:
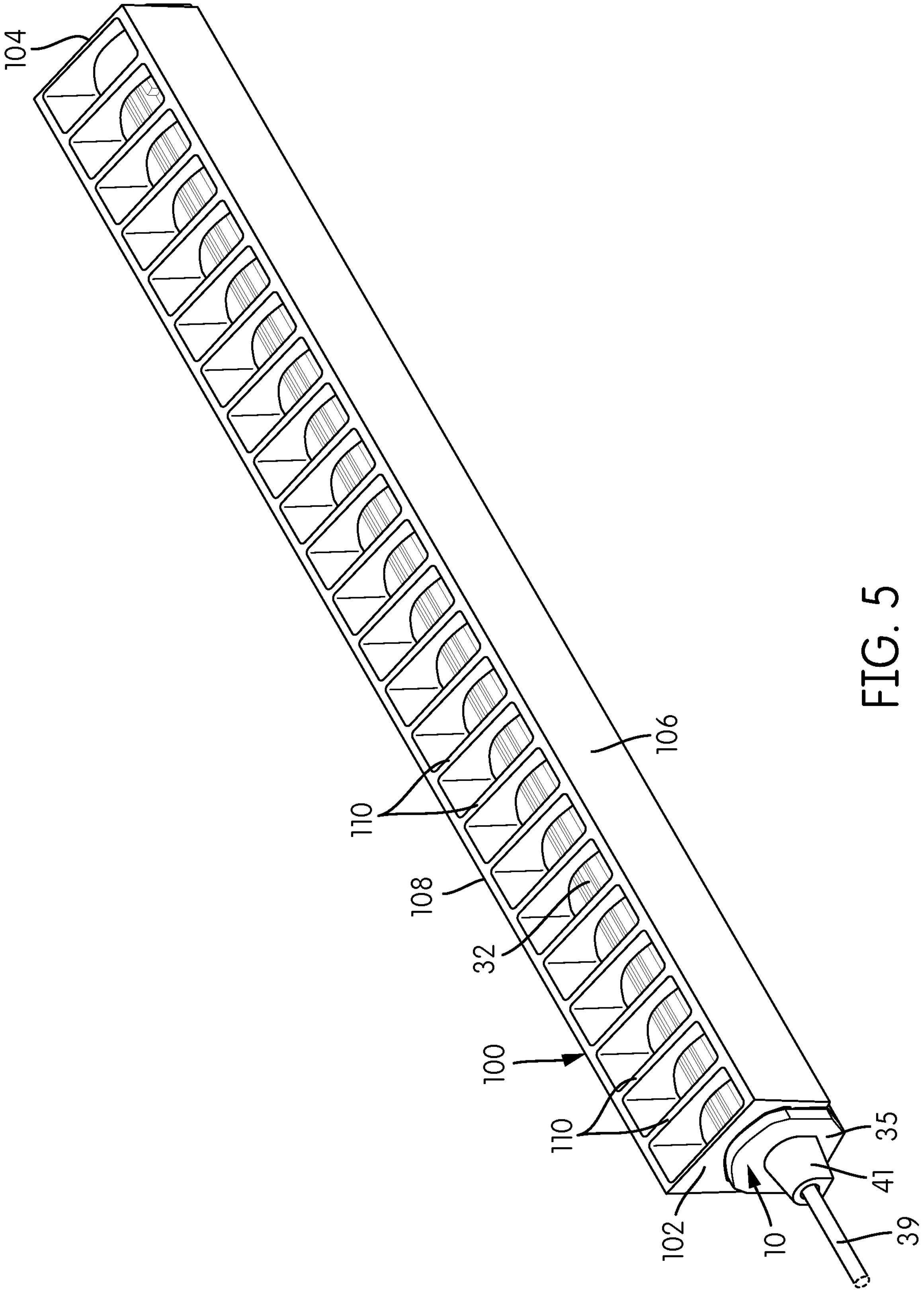
FIG. 5 is a perspective view of a linear luminaire with an external set of louvers according to another embodiment of the invention.

The set of louvers 20 of FIGS. 1-4C constrains the emission of light both to the sides of the linear luminaire 10 and, to some extent, to the front and back of the linear luminaire 10. In other embodiments, the set of louvers that is applied to the linear luminaire 10 may be adapted to particularly constrain light in certain planes or directions. FIG. 5 is an example of this. In FIG. 5, a set of louvers 100 is contoured to preferentially constrain light emission in certain directions. The set of louvers 100 has end walls 102,

104, a front wall 106, and a rear wall 108. (The terms "front" and "rear" are used here with respect to the coordinate system of FIG. 5; the linear luminaire 10 with its set of louvers 100 may be installed differently.) Individual slats or louvers 110 extend between the front wall 106 and the rear wall 108 along the length of the set of louvers 100. The slats or louvers 110 are set at a regular pitch.

In the set of louvers 100, the rear wall 108 is taller than the front wall 106. The louvers 110 match the height of the rear wall 108 where they connect with the rear wall 108, and they match the height of the front wall 106 where they connect with the front wall 106. In this embodiment, the transition between the two heights is linear, giving the top of the set of louvers 100 a triangular shape, as seen in the cross-sectional views of FIGS. 6A-6C. The transition between the two heights could be along a curve. Alternatively, the upper portion of a set of louvers 100 could have any other contour or shape.

Figure 6A:
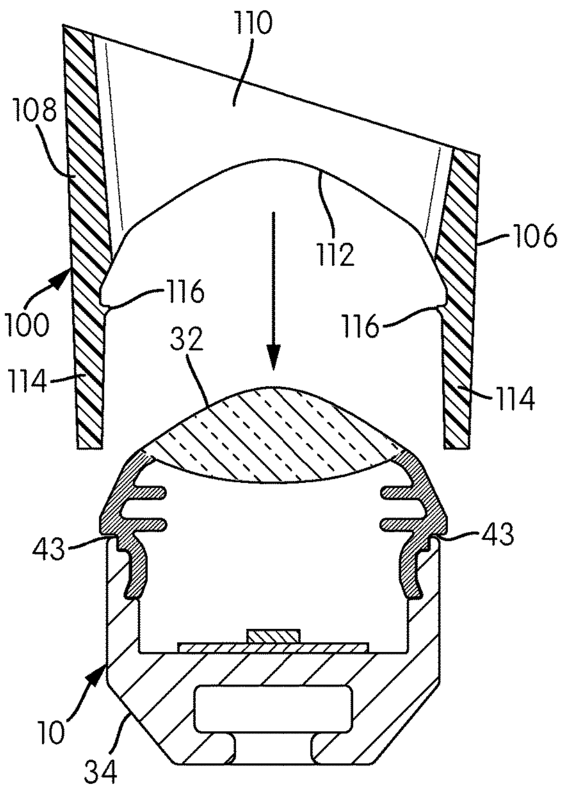
FIGS. 6A-6C are a series of cross-sectional views illustrating the attachment of the external set of louvers of FIG. 5 to the linear luminaire.
Figure 6B:
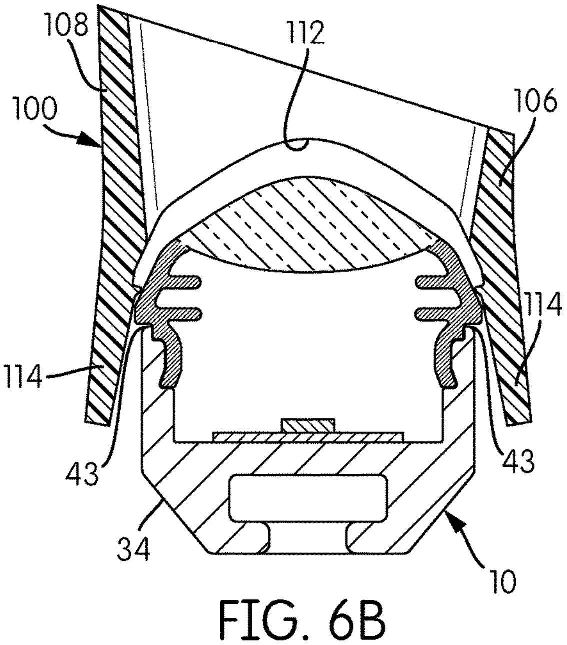
Figure 6C:
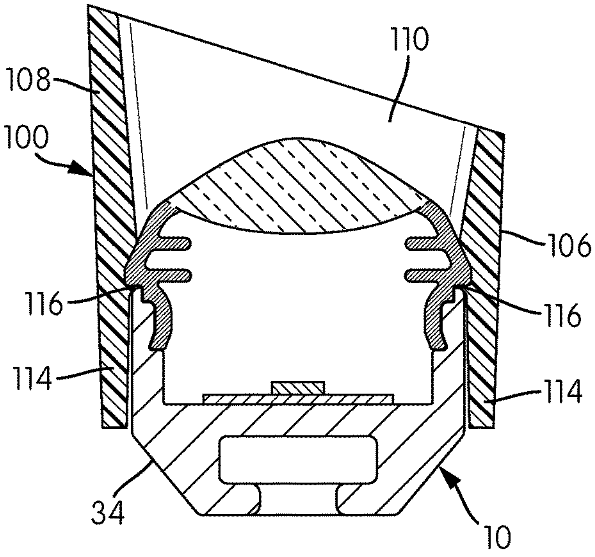

FIGS. 6A-6C are views similar to the views of FIGS. 4A-4C, illustrating the placement of the set of louvers 100 over a linear luminaire 10. As can be seen in FIGS. 6A-6C, the individual slats or louvers 110 are also taller toward the rear wall 108. However, the set of louvers 100 is otherwise similar to the set of louvers 20 described above. In particular, the shape of the interior cavity of the set of louvers 100, and particularly the contour 112 defined along bottom edges of the slats or louvers 110, matches that of the outermost element 32. As the set of louvers 100 is pushed down over the linear luminaire 10, the lower portions 114 deflect outwardly until the tongues 116 engage in the grooves, leaving the final position shown in FIG. 6C.

The advantage of the scheme shown in FIGS. 4A-4C and FIGS. 6A-6C is that sets of louvers 30, 100 can be attached or detached to the exterior of a linear luminaire 10 to suit particular applications and needs. Because the sets of louvers 30, 100 are entirely external, it is not necessary to open, disassemble, or rebuild a linear luminaire 10 to use it with a set of louvers 30, 100. One can simply "snap on" sets of louvers 30, 100 and pull them off as necessary.

In the figures and foregoing description, the sets of louvers 30, 100 engage with grooves 43 defined between the channel 34 and the outermost element 32 of an optical system installed in the channel 34. However, the sets of louvers 30, 100 may engage with other grooves, spaces, or features of a linear luminaire. For example, in some cases, grooves for engagement could be formed on the channel 34 in other locations. If the particular application demands it, or if it is convenient for other reasons, sets of louvers 30, 100 could be secured with adhesives or fasteners. For example, set screws may be helpful in securing a set of louvers 30, 100 to a linear luminaire 10. If no engaging features are available on the channel and adhesives or fasteners are undesirable in a particular application, a set of louvers could be designed to exert more compressive force on the linear luminaire with which it is to engage, so that no particular complementary engaging structures are needed, or a set of louvers could be provided with portions that "wrap around" various sides of the linear luminaire to engage.

While one type of linear luminaire 10 is shown and described here, sets of louvers according to embodiments of the invention may be used with many different types of linear luminaires. As those of skill in the art will appreciate, when the nature of the linear luminaire 10 is different, the internal contour 44, 112 of the set of louvers 30, 100 will also be different—made to complement the shape of the linear luminaire to which the set of louvers is meant to attach.

Figure 7:
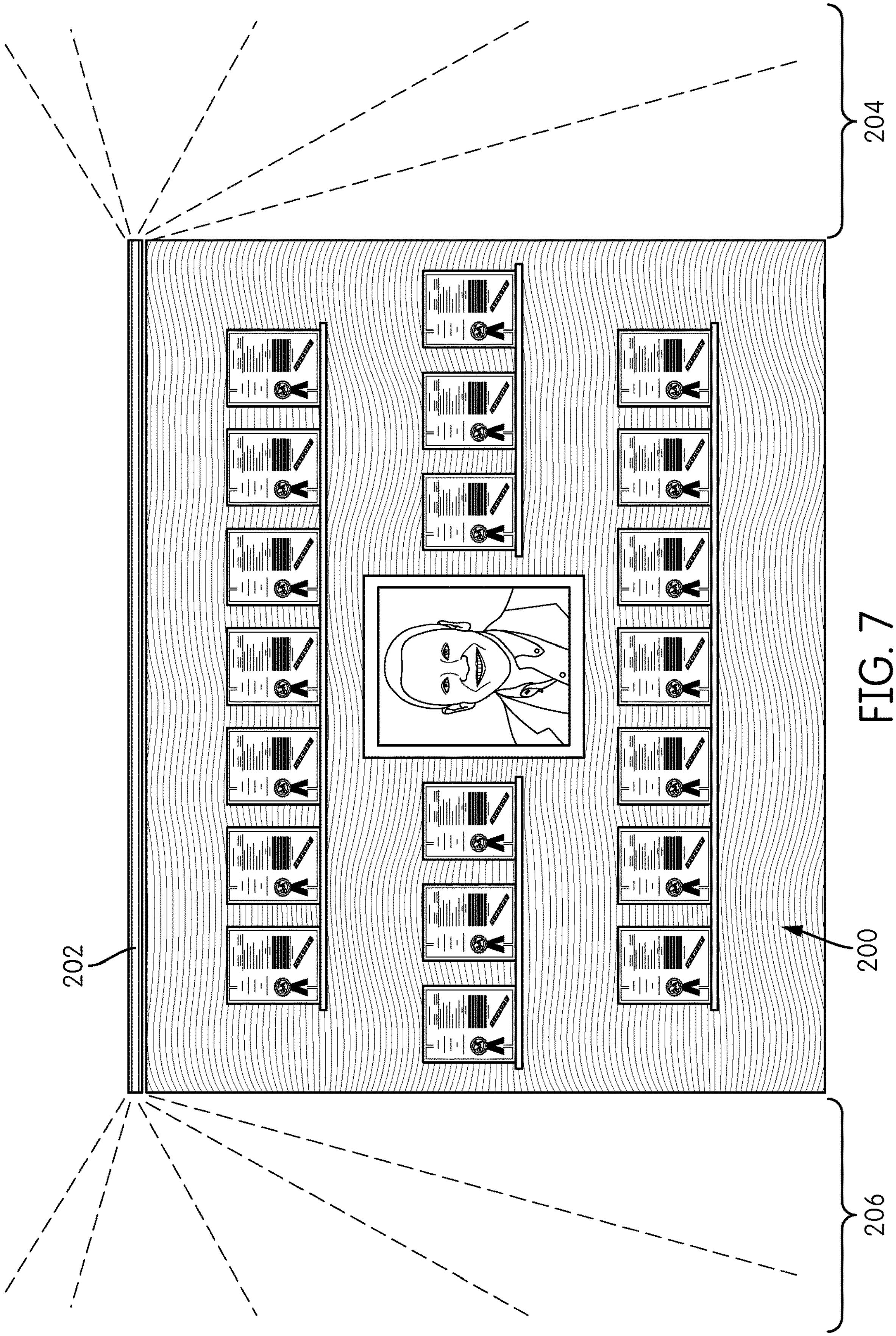
FIG. 7 is a front elevational view of a wall illustrating the extent of spill light when using a linear luminaire without louvers as a wall grazer.
Figure 8A:
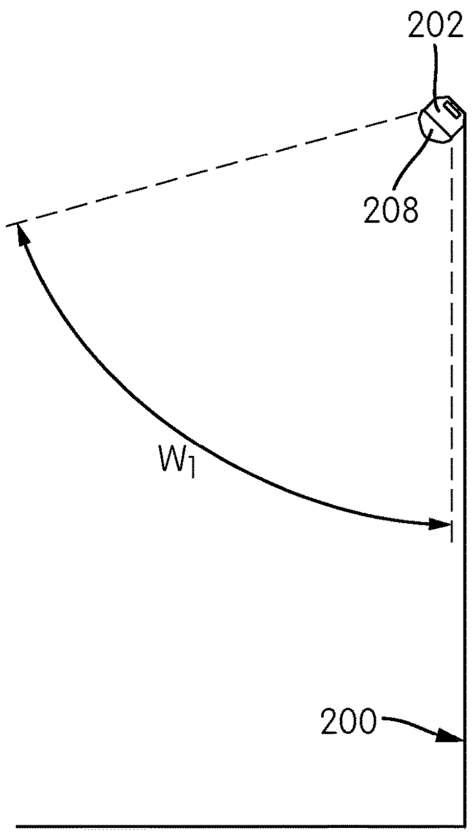
FIGS. 8A and 8B are side elevational views illustrating the beam angle of a linear luminaire without and with an external set of louvers.
Figure 8B:
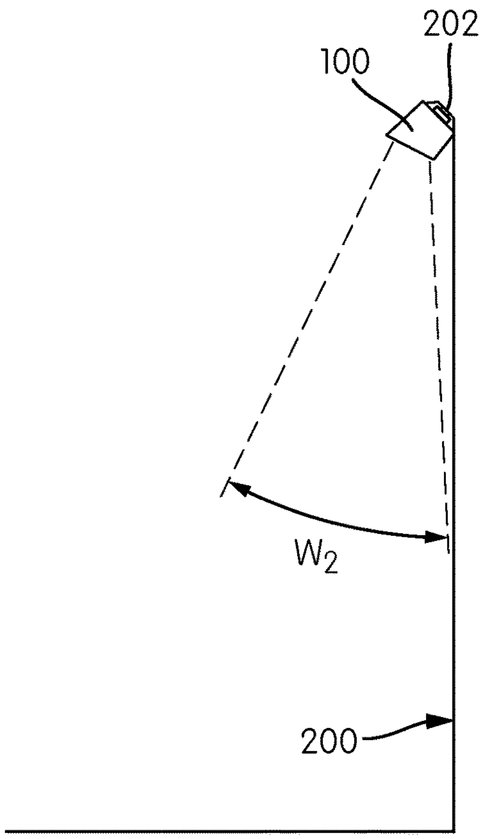

The purpose and effect of sets of louvers 30, 100 is illustrated in FIGS. 7, 8A, and 8B. In particular, FIG. 7 is an elevational view of a wall, generally indicated at 200. The wall 200 has various decorative elements, and a linear luminaire 202 is installed at the top of the wall 200 to serve as a "wall grazer" and light the wall to accent and emphasize the decorative elements on the wall. In this example, the linear luminaire 202 does not have a set of louvers 30, 100 installed. In this scenario, the linear luminaire 202 may adequately light the wall. In fact, as was described above, the linear luminaire 202 may have an optical system that, e.g., constrains the width of the beam so that it does not extent far forward of the wall.

However, despite the fact that the linear luminaire 202 in this example adequately lights the wall 200, there are zones of spill light 204, 206 to either side of the wall 202 where the optical system of the linear luminaire 202 does not affect the light-emission characteristics of the linear luminaire. That spill light 204, 206 could throw unwanted light on adjacent walls, ruining the lighting on those walls, or it could blind people who are passing by. Neither is desirable. Sets of louvers 30, 100, however, may prevent or constrain the extent of such spill light 204, 206.

FIG. 8A illustrates the wall 200 from the side, showing the linear luminaire 202 that is set as a wall grazer and its beam width $W_1$ outward from the wall. For purposes of this example, the linear luminaire 202 is assumed to have an optical element or system 208 that constrains the natural beam width of its light engines 38 to, e.g., 60°, 30°, 20°, etc. However, the optical system 208 installed on or in the linear luminaire 202 may still allow a significant beam width $W_1$, such that light could intrude into the room. In FIG. 8B, a set of louvers 100 is installed on the linear luminaire 202 with the raised side 108 of the set of louvers 100 outward. This constrains the light to a smaller beam width $W_2$.

The present inventors have found that sets of louvers 30, 100 according to embodiments of the invention can meaningfully change the beam width and characteristics of a linear luminaire with a relatively small size. For example, a set of louvers 30 may be only about 1 inch (2.5 cm) from its bottom to its top, with only about 0.5 inches (1.25 cm) extending above the outermost element 32 of the linear luminaire 10. The taller side 108 of the set of louvers 100 may be only about 6 mm taller than the opposite side 106.

Of course, the effect of a set of louvers 30, 100 depends strongly on the nature of the original beam of light, as well as the precise characteristics of the set of louvers 30, 100. For example, in some cases, if the linear luminaire 10 naturally emits a beam with a 10° beam width, a set of louvers 30, 100 may broaden the beam somewhat, i.e., it may interfere slightly with the effect of an optical system. However, that does not necessarily mean that a set of louvers 30, 100 should not be used in such a case—a set of louvers 30, 100 may still help to reduce or eliminate spill light.

Both of the sets of louvers 20, 100 described above have individual slats or louvers 30, 110 set at a regular pitch or spacing from one another. However, that need not be the case in all embodiments. Along the length of a set of louvers 20, 100, individual slats or louvers 30, 110 may be set at two or more different pitches. For example, over the length of a linear luminaire 10, more louvers 30, 110 may be needed over a particular span to provide more control over the light emission in that span. Overall, there is no requirement that the louvers 30, 110 be spaced at any regular pitch or spacing at all. The spacing of the louvers 30, 110, the upper shape or contour of the sets of louvers 20, 100, and other such characteristics will vary with the application and/or installation. The desired beam characteristics can be established and tested for any combination of linear luminaire and set of louvers using well-known techniques, such as goniophotometry.

While the invention has been described with respect to certain embodiments, the description is intended to be exemplary, rather than limiting. Modifications and changes may be made within the scope of the invention, which is defined by the appended claims.

What is claimed is:

1. A set of louvers, comprising:

an elongate first wall;

an elongate second wall spaced from, and extending parallel to, the first wall;

a plurality of louvers extending between and fixed to the first wall and the second wall, each of the plurality of louvers being spaced from and parallel to the others, the plurality of louvers extending perpendicular to the first wall and the second wall;

first and second side portions depending from the first wall and the second wall, respectively;

an internal cavity defined by bottoms of the plurality of louvers and the first and second side portions; and engaging structure defined on surfaces of the first and second side portions that face one another, such that the engaging structures are arranged to engage a lighting source fitted at least partially within the internal cavity.

2. The set of louvers of claim 1, wherein ones of the plurality of louvers are spaced apart from each other at a regular spacing or pitch.

3. The set of louvers of claim 1, wherein the first wall and the second wall have generally equal heights.

4. The set of louvers of claim 3, wherein each of the plurality of louvers has a height equal to the heights of the first wall and the second wall.

5. The set of louvers of claim 1, wherein the first wall and the second wall have unequal heights.

6. The set of louvers of claim 1, wherein the first wall has a height greater than a height of the second wall.

7. The set of louvers of claim 6, wherein each of the plurality of louvers matches the height of the first wall at the first wall and matches the height of the second wall at the second wall.

8. The set of louvers of claim 7, wherein each of the plurality of louvers makes a linear transition between the height of the first wall and the height of the second wall.

9. The set of louvers of claim 1, wherein the engaging structure comprises a set of tongues positioned across from one another.

10. The set of louvers of claim 1, wherein the internal cavity has a contour defined along a bottom edge of each of the plurality of louvers.

11. The set of louvers of claim 10, wherein each of the plurality of louvers has the same contour along the bottom edge thereof, such that the internal cavity extends along a length of the set of louvers.

12. In combination:

a linear luminaire, including a channel, a strip of linear lighting positioned in the channel, and a covering closing the channel; and a set of louvers, including an elongate first wall, an elongate second wall spaced from, and extending parallel to, the first wall, a plurality of louvers extending between and fixed to the first wall and the second wall, each of the plurality of louvers being spaced from and parallel to the others, the plurality of louvers extending perpendicular to the first wall and the second wall, first and second side portions depending from the first wall and the second wall, respectively, an internal cavity defined by bottoms of the plurality of louvers and the first and second side portions, and engaging structure defined on surfaces of the first and second side portions that face one another, such that the engaging structure is adapted to engage the linear luminaire when the linear luminaire is positioned at least partially within the internal cavity of the set of louvers.

13. The combination of claim 12, wherein the linear luminaire comprises grooves on opposed faces thereof, and the engaging structure comprises tongues adapted to fit within the grooves.

14. The combination of claim 12, wherein the first and second side portions are adapted to deflect resiliently outward to come into engagement with the linear luminaire, such that they are resiliently biased to exert force in an inward direction, against respective sides of the linear luminaire.

15. The combination of claim 12, wherein the internal cavity matches an upper shape of the linear luminaire.

16. The combination of claim 12, wherein the first wall and the second wall have generally equal heights.

17. The combination of claim 12, wherein each of the plurality of louvers has a height equal to the heights of the first wall and the second wall.

18. The combination of claim 12, wherein the first wall and the second wall have unequal heights.

19. The combination of claim 12, wherein each of the plurality of louvers matches the height of the first wall at the first wall and matches the height of the second wall at the second wall.

20. A set of louvers, comprising:

an elongate first wall;

an elongate second wall spaced from, and extending parallel to, the first wall;

a plurality of louvers extending between and fixed to the first wall and the second wall, each of the plurality of louvers being spaced from and parallel to the others, the plurality of louvers extending perpendicular to the first wall and the second wall;

first and second side portions depending from the first wall and the second wall, respectively;

an internal cavity defined by bottoms of the plurality of louvers and the first and second side portions; and tongues defined on surfaces of the first and second side portions that face one another, such that the tongues are positioned across from one another.

21. In combination:

a linear luminaire, including a channel, a strip of linear lighting positioned in the channel, and a covering closing the channel; and a set of louvers, including an elongate first wall, an elongate second wall spaced from, and extending parallel to, the first wall, a plurality of louvers extending between and fixed to the first wall and the second wall, each of the plurality of louvers being spaced from and parallel to the others, the plurality of louvers extending perpendicular to the first wall and the second wall, first and second side portions depending from the first wall and the second wall, respectively, an internal cavity defined by bottoms of the plurality of louvers and the first and second side portions, and engaging structure defined on surfaces of the first and second side portions that face one another, such that the engaging structure is adapted to engage the linear luminaire when the linear luminaire is positioned at least partially within the internal cavity of the set of louvers;

wherein the first and second side portions are adapted to deflect resiliently outward to come into engagement with the linear luminaire, such that they are resiliently biased to exert force in an inward direction, against respective sides of the linear luminaire.

* * * * *